United States Patent
Truong et al.

(10) Patent No.: US 10,686,498 B2
(45) Date of Patent: Jun. 16, 2020

(54) SYSTEMS AND METHODS FOR MASSIVE MIMO ADAPTATION

(71) Applicant: Huawei Technologies Canada Co., Ltd., Kanata (CA)

(72) Inventors: Kien Trung Truong, Hanoi (VN); Robert Wendell Heath, Jr., Austin, TX (US); Hosein Nikopour, Ottawa (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 0 days.

(21) Appl. No.: 14/675,449

(22) Filed: Mar. 31, 2015

(65) Prior Publication Data
US 2016/0294453 A1    Oct. 6, 2016

(51) Int. Cl.
*H04B 7/0452* (2017.01)
*H04B 7/0417* (2017.01)
(Continued)

(52) U.S. Cl.
CPC ......... *H04B 7/0452* (2013.01); *H04B 7/0417* (2013.01); *H04B 7/0617* (2013.01);
(Continued)

(58) Field of Classification Search
CPC .. H04B 7/0452; H04B 7/0413; H04B 7/0456; H04B 7/0626; H04B 7/0691;
(Continued)

(56) References Cited

U.S. PATENT DOCUMENTS

| 6,052,605 A * | 4/2000 | Meredith | H04W 72/082 455/560 |
| 6,085,076 A * | 7/2000 | Lindsay | H04B 7/0604 455/133 |

(Continued)

FOREIGN PATENT DOCUMENTS

| CN | 103312395 A | 9/2013 |
| CN | 103532607 A | 1/2014 |

(Continued)

OTHER PUBLICATIONS

Benmimoune et al., "Joint transmit antenna selection and user scheduling for Massive MIMO systems," 2015 IEEE Wireless Communications and Networking Conference (WCNC), New Orleans, LA, Mar. 12, 2015, pp. 381-386.*

(Continued)

*Primary Examiner* — Michelle M Koeth
(74) *Attorney, Agent, or Firm* — Slater Matsil, LLP (57) ABSTRACT

A method for improved efficiency for massive MIMO adaptation. In an embodiment, method for operating a network component in a massive MIMO network includes obtaining, by the network component, one or more network parameters; determining, by the network component, a number of active antennas in a massive MIMO AP to use for transmitting in one time frame according to the one or more network parameters, the number of active antennas selected being less than a total number of antennas available in the massive MIMO AP; and serving one or more UEs using the determined number of active antennas. Other embodiments (Continued)

reduce the number of beamformers utilized according to network parameters. In still other embodiments, a number of data streams to transmit and a corresponding number of users to be served in a time frame by a massive MIMO AP is reduced.

18 Claims, 6 Drawing Sheets

(51) Int. Cl.
  *H04W 88/02* (2009.01)
  *H04W 88/08* (2009.01)
  *H04B 7/06* (2006.01)

(52) U.S. Cl.
  CPC .......... *H04B 7/0691* (2013.01); *H04W 88/02* (2013.01); *H04W 88/08* (2013.01); *H04B 7/0695* (2013.01)

(58) Field of Classification Search
  CPC .. H04B 7/0469; H04B 7/0608; H04B 7/0417; H04B 7/0617; H04B 7/0695; H04W 24/02; H04W 72/1226; H04W 88/08; H04W 88/02
  See application file for complete search history.

(56) References Cited

U.S. PATENT DOCUMENTS

| | | | | |
|---|---|---|---|---|
| 8,654,815 | B1* | 2/2014 | Forenza | H04B 7/0626 375/141 |
| 2014/0119301 | A1 | 5/2014 | Park et al. | |
| 2014/0177607 | A1* | 6/2014 | Li | H04B 7/0695 370/336 |
| 2014/0307814 | A1* | 10/2014 | Jalloul | H04B 7/0413 375/267 |
| 2015/0016379 | A1* | 1/2015 | Nam | H04B 7/0639 370/329 |
| 2015/0043450 | A1 | 2/2015 | Ariyavisitakul et al. | |
| 2015/0111507 | A1* | 4/2015 | Alpert | H04B 17/00 455/67.14 |
| 2015/0131580 | A1* | 5/2015 | Liu | H04B 7/0452 370/329 |
| 2015/0195024 | A1* | 7/2015 | Kim | H04B 7/0456 375/295 |
| 2015/0304081 | A1* | 10/2015 | Park | H04W 24/10 370/329 |

FOREIGN PATENT DOCUMENTS

| | | |
|---|---|---|
| CN | 104052535 A | 9/2014 |
| CN | 104113366 A | 10/2014 |
| EP | 2810382 B1 | 8/2016 |
| WO | 2014078701 A2 | 5/2014 |

OTHER PUBLICATIONS

Benmimoune et al., "Joint transmit antenna selection and user scheduling for Massive MIMO systems," 2015 IEEE Wireless Communications and Networking Conference (WCNC), New Orleans, LA, Mar. 12, 2015, pp. 381-386 (Year: 2015).*

Liu et al., "Low-Complexity User Scheduling with Switched Tilting for 3D Cellular Systems" Mathematical Problems in Engineering, Hindawi Publishing Corporation, vol. 2015, Mar. 4, 2015 , 9 pages. (Year: 2015).*

* cited by examiner

SYSTEMS AND METHODS FOR MASSIVE MIMO ADAPTATION

TECHNICAL FIELD

The present invention relates generally to a system and method for wireless communication, and, in particular embodiments, to a system and method for massive MIMO networks.

BACKGROUND

Massive multiple input, multiple output (MIMO) is a candidate technology for 5G wireless networks. In contrast to base stations for conventional MIMO systems, base stations in massive MIMO systems are equipped with many more antennas (e.g., approximately 20 to 100 antennas or more in next generation systems). In massive MIMO, a larger number of users are served simultaneously using multiuser MIMO techniques. In massive MIMO, thermal noise and fast fading vanish. Massive MIMO also provides simplified multiuser processing, reduced transmit power, and high sum-rates.

Channel state information (CSI) is an important parameter in massive MIMO systems. The CSI is used on the uplink to separate users through receive beamforming and is used on the downlink to send different data to different users through transmit beamforming.

Prior work on massive MIMO often assumes time division duplexing (TDD). Due to channel reciprocity, forward and reverse link channels are the same in TDD. The base station estimates channels based on uplink pilots. Due to channel reciprocity, explicit channel state information (CSI) feedback is not required. However, uplink channel estimates may be contaminated by pilot reuse in neighboring cells. Furthermore, non-ideal hardware and calibration error cause additional channel estimation errors.

Although the prior work on massive MIMO often assumes TDD mode, it would be desirable to have a massive MIMO with the benefits of FDD mode. FDD is a common duplexing strategy in current wireless systems. Therefore, upgrading to a FDD based massive MIMO system may be desirable. However, in FDD mode, channel reciprocity no longer holds due to different carrier frequencies on the uplink (UL) and the downlink (DL). DL training is required for the user to estimate downlink CSI for coherent detection. Furthermore, all users often need to send an estimate of the downlink CSI to the base station for precoding design in what is usually called feedback. However, this feedback consumes valuable system resources.

SUMMARY

In accordance with an embodiment of the present invention, a method for operating a network component in a massive multiple-input, multiple-output (MIMO) network, obtaining, by the network component, one or more network parameters; determining, by the network component, a number of active antennas in a massive MIMO access point (AP) to use for transmitting in one time frame according to the one or more network parameters, the number of active antennas selected being less than a total number of antennas available in the massive MIMO AP; and serving one or more user equipment (UEs) using the determined number of active antennas.

In accordance with another embodiment, a method for operating network component in a massive MIMO network includes obtaining, by the network component, one or more network parameters; determining, by the network component, a number of predetermined static analog beamformers to use for transmitting in one time frame from a massive MIMO AP according to at least one of a number of users to be served, large-scale fading coefficients of channels from the massive MIMO AP to the users, delays in the massive MIMO network, and user mobility, the number of beamformers selected being less than a total number of beamformers available; and serving the users to be served using the determined number of static analog beamformers via the massive MIMO AP.

In accordance with another embodiment, a method for operating a network component in a massive multiple-input, multiple-output (MIMO) network includes obtaining, by the network component, one or more network parameters; determining, by the network component, a number of data streams to transmit and a corresponding number of users to be served in a time frame by a massive MIMO access point (AP), the number of data streams being less than a total number of data streams available; and serving the determined number of users using the determined number of data streams.

In accordance with another embodiment, a network component in a massive multiple-input, multiple-output (MIMO) network includes a processor; and a non-transitory computer readable storage medium storing programming for execution by the processor, the programming including instructions to: determine a number of active antennas in a massive MIMO access point (AP) to use for transmitting in one time frame according to one or more network parameters, the number of active antennas selected being less than a total number of antennas available; and serve one or more user equipment (UEs) using the determined number of active antennas.

In accordance with another embodiment, a network component for adaptively improving efficiency in a massive multiple-input, multiple-output (MIMO) network includes a processor and a non-transitory computer readable storage medium storing programming for execution by the processor, the programming including instructions to: determine a number of predetermined static beamformers to use for transmitting via analog beamforming in one time frame from a massive MIMO access point (AP) according to at least one of a number of users to be served, large-scale fading coefficients of channels from the massive MIMO AP to the users, delays in the MIMO network, and user mobility, the number of beamformers selected being less than a total number of beamformers available; and serve the users to be served using the determined number of static analog beamformers via the massive MIMO AP.

In accordance with another embodiment, a network component in a massive multiple-input, multiple-output (MIMO) network includes a processor and a non-transitory computer readable storage medium storing programming for execution by the processor, the programming including instructions to: determine a number of data streams to transmit and a corresponding number of users to be served in a time frame by a massive MIMO access point (AP), the number of data streams being less than a total number of data streams available; and serve the determined number of users using the determined number of data streams.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In FDD massive MIMO systems, the amount of overhead for DL pilot transmission and DL CSI feedback scales with the number of base station antennas rather than the number of users. The more resources used for downlink CSI acquisition often result in more accurate CSI and hence a larger amount of data that can be sent in one time slot. However, using more resources for downlink CSI acquisition reduces the resources allocated for actual data transmission. Thus, there is a trade-off between the number of slots used for actual data transmission versus the amount of data that can be sent in one slot. According to theoretical results, downlink rates in one slot increase logarithmically with the number of antennas at the base station (with a sufficiently large number of antennas at the base station) when serving a given number of users. Due to the training and feedback overhead, the number of slots used for actual data transmission decreases linearly with the number of antennas at the base station. This tradeoff does not appear in conventional FDD MIMO because the number of antennas in conventional FDD MIMO is small.

It has been observed that the performance of an FDD massive MIMO varies depending on the number of base station antennas, the mobility of the users, and the number of users per cell. Thus, it is an insight of this disclosure that because of overhead scaling, performance improvements can be achieved by adjusting the number of active antennas trained based on the system environment. In an embodiment, the selected number of active antennas depends on (1) the number of users that need to be served, (2) the large-scale fading coefficients of the channels from the base station to the users, and (3) delays and mobility in the system. The large-scale fading coefficients may be related to the average receive signal strength for example as a function of transmission distances between the base station and the users and to shadowing by large objects such as buildings or hills.

Although the systems and methods of this disclosure are described primarily with reference to FDD systems, those of ordinary skill in the art will recognize that the disclosed methods and systems may be applied to time division duplexing (TDD) systems as well. For example, if a TDD system is not exploiting reciprocity, then downlink training may be required, in which case, the methods and systems for reducing the number of active antennas or active beams would be beneficial for a TDD system.

In an embodiment, a method for operating a network component in a massive MIMO network includes obtaining, by the network component, one or more network parameters; and determining, by the network component, one of a number of active antennas in a massive MIMO AP to use for transmitting in one time frame according to the one or more network parameters, the number of active antennas selected being less than a total number of antennas available in the massive MIMO AP. The network parameters may include Doppler estimates from one or more UEs, a number of users to be served by the massive MIMO AP, a mobility of UEs, delays in the massive MIMO network, and/or large-scale fading coefficients of a channel from the massive MIMO AP to one or more UEs. In an embodiment, the network parameters include channel quality parameters and the method may also include grouping ones of a plurality of UEs into a plurality of groups of UEs based on the channel quality parameters, determining a number of active antennas for each group; and serving each group of UEs using the determined number of active antennas for that group. The channel quality parameters may be obtained from feedback from one or more UEs. The method may also include sharing user group descriptions with the UEs; receiving an indication from one of the UEs that the one of the UEs should be moved to a different group; and adding the one of the UEs to the different group. In an embodiment, the method includes determining a second number of active antennas in the massive MIMO AP to use for transmitting in a second time frame according to one or more updated network parameters, wherein the second number of active antennas determined for use in the second time frame is different from the number of active antennas determined for use in the one time frame. The network component may be the massive MIMO AP or another component communicating with the massive MIMO AP.

In an embodiment, a method for operating network component in a massive multiple-input, multiple-output (MIMO) network includes obtaining, by the network component, one or more network parameters; determining, by the network component, a number of predetermined static analog beamformers to use for transmitting in one time frame from a massive MIMO access point (AP) according to at least one of a number of users to be served, large-scale fading coefficients of channels from the massive MIMO AP to the users, delays in the massive MIMO network, and user mobility, the number of beamformers selected being less than a total number of beamformers available; and serving the users to be served using the determined number of static analog beamformers via the massive MIMO AP.

In an embodiment, a method for operating a network component in a massive MIMO network includes obtaining, by the network component, one or more network parameters; determining, by the network component, a number of data streams to transmit and a corresponding number of users to be served in a time frame by a massive MIMO AP, the number of data streams being less than a total number of data streams available; and serving the determined number of users using the determined number of data streams. In an embodiment, all of the antennas in the massive MIMO AP are used to serve the determined number of users using the determined number of data streams. In an embodiment, the method also includes using a fixed precoder to serve the determined number of users using the determined number of data streams via all of the antennas in the massive MIMO AP.

In an embodiment, a network component in a massive MIMO network includes a processor and a non-transitory computer readable storage medium storing programming for execution by the processor, the programming including instructions to determine a number of active antennas in a massive MIMO AP to use for transmitting in one time frame according to one or more network parameters, the number of active antennas selected being less than a total number of antennas available in the massive MIMO AP. The network parameters may include Doppler estimates from one or more UEs, a number of users to be served by the massive MIMO AP, mobility of the UEs, delays in the massive MIMO network, and large-scale fading coefficients of a channel from the massive MIMO AP to one or more UEs. In an embodiment, the network parameters may include channel quality parameters and the programming may include instructions to group ones of the UEs into a plurality of groups of UEs based on the channel quality parameters, determine a number of active antennas for each group, and serve each group of UEs using the determined number of active antennas for that group. The channel quality parameters may be obtained from feedback from one or more of the plurality of UEs. The programming may also include instructions to share user group descriptions with the UEs, receive an indication from one of the UEs that the one of the UEs should be moved to a different group, and add the one of the UEs to the different group. The programming may also include instructions to determine a second number of active antennas in the massive MIMO AP to use for transmitting in a second time frame according to one or more updated network parameters, wherein the second number of active antennas determined for use in the second time frame is different from the number of active antennas determined for use in the one time frame.

In an embodiment, a network component for use in a MIMO network includes a processor and a non-transitory computer readable storage medium storing programming for execution by the processor, the programming including instructions to: determine a number of predetermined static beamformers to use for transmitting via analog beamforming in one time frame from a massive MIMO AP according to at least one of a number of users to be served, large-scale fading coefficients of channels from the massive MIMO AP to the users, delays in the MIMO network, and user mobility, the number of beamformers selected being less than a total number of beamformers available; and serve the users to be served using the determined number of static analog beamformers via the massive MIMO AP.

In an embodiment, a network component in a massive MIMO network includes a processor and a non-transitory computer readable storage medium storing programming for execution by the processor, the programming including instructions to: determine a number of data streams to transmit and a corresponding number of users to be served in a time frame by a massive MIMO access point (AP), the number of data streams being less than a total number of data streams available; and serve the determined number of users using the determined number of data streams. In an embodiment, all of the antennas in the massive MIMO AP are used to serve the determined number of users using the determined number of data streams. In an embodiment, the programming further includes instructions to use a fixed precoder to serve the determined number of users using the determined number of data streams via all of the antennas in the massive MIMO AP.

Figure 1:
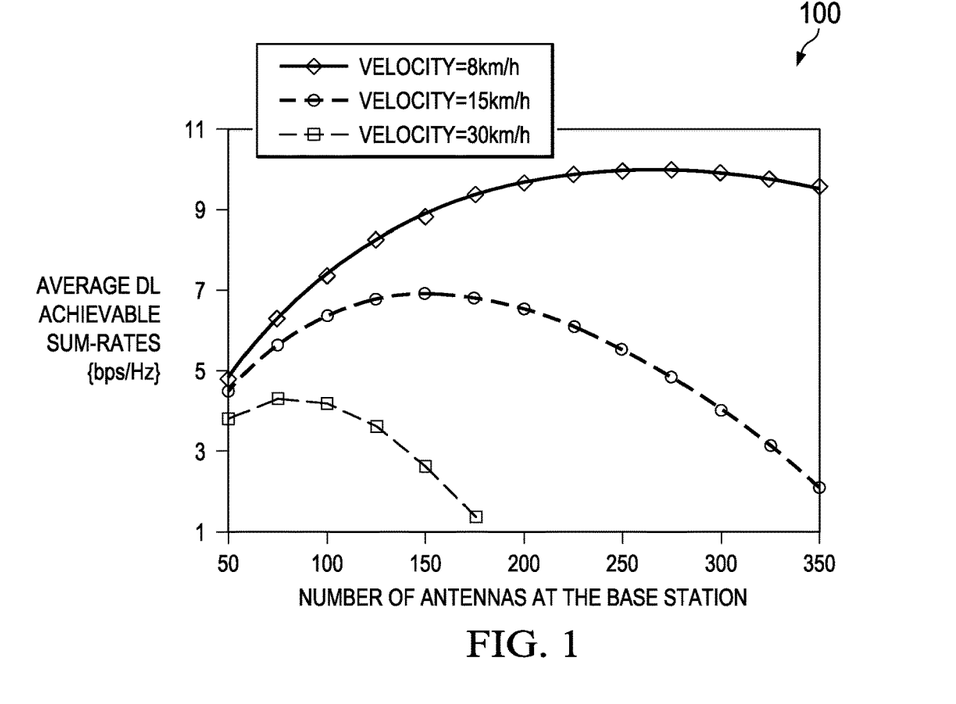
FIG. 1 shows a graph of average DL achievable sum-rates as a function of the number of antennas at the base station for three different velocities for the users with 12 users per cell.

FIG. 1 shows a graph 100 of average DL achievable sum-rates as a function of the number of antennas at the base station for 12 users per cell having different velocities. The number of antennas is the number used for UL CSI estimation, DL CSI estimation, DL CSI feedback and DL data transmission. As can be seen in graph 100, there is a relationship between the number of antennas utilized and the maximum average DL achievable sum-rate.

Furthermore, it can be seen that the number of antennas for the maximum average DL achievable sum-rate varies depending on the velocity of the users in the cell. For example, when the velocity of the users in the cell is 30 kilometers (km)/hour (h), the number of antennas producing the maximum average DL achievable sum-rate is somewhere between 50 and 100 antennas. In contrast, when the velocity of the users is 15 km/h, the maximum average DL achievable sum-rate is achieved with approximately 150 antennas. Thus, the number of active antennas used to produce the maximum average DL achievable sum-rate varies with the velocity of the users. Inactive antennas in a frame may be turned off. It should be noted that antennas turned off in one frame may be turned on in another frame and antennas turned on in one frame may be turned off in another frame.

Figure 2:
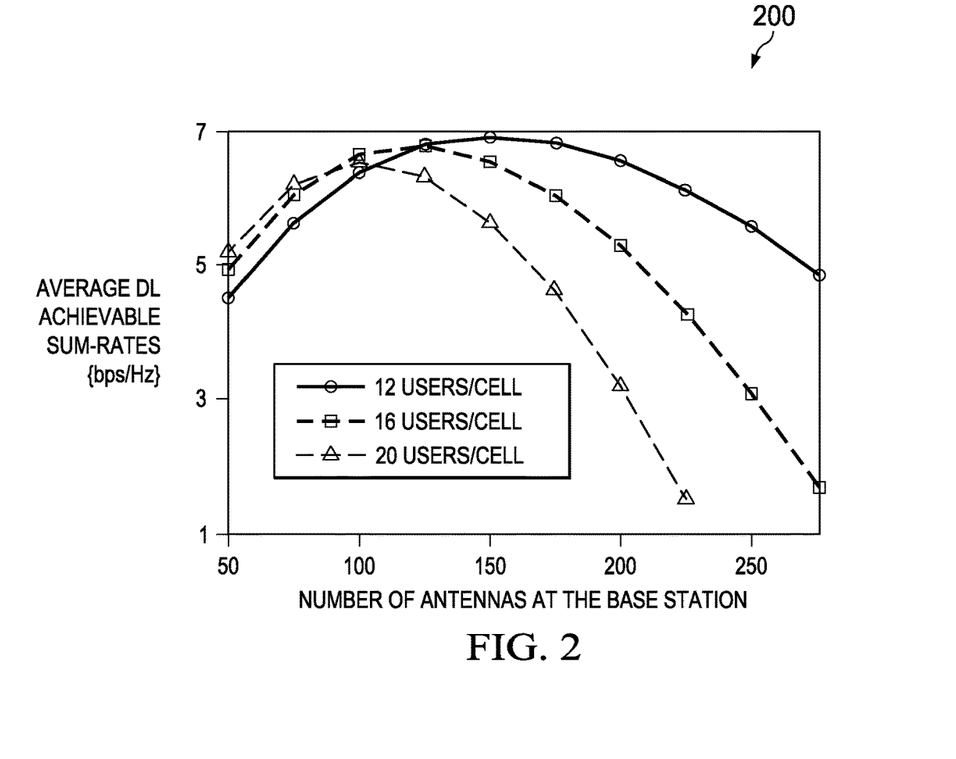
FIG. 2 shows a graph of the average DL achievable sum-rates as a function of the number of antennas at the base station for three different numbers of users/cell all moving at the same velocity.

FIG. 2 shows a graph 200 of the average DL achievable sum-rates as a function of the number of antennas at the base station for three different numbers of users/cell all moving at the same velocity. As can be seen from graph 200, the number of antennas that produces the maximum average DL achievable sum-rate varies by the number of users per cell. For example, the number of antennas producing the maximum average DL achievable sum-rate for 12 users/cell is about 150 antennas, but the number of antennas producing the maximum average DL achievable sum-rate for 20 users/cell is about 100 antennas. Thus, the number of antennas used to produce the maximum average DL achievable sum-rates varies with the number of users/cell.

Disclosed herein are systems and methods for massive MIMO that adjust the number of antennas used at a base station for DL CSI acquisition based on various network parameters, such as the number of users in a group, the average velocity of the users in the group, and other feedback from the users. In an embodiment, some antennas at the base station are turned off or inactivated. In another embodiment, all base station antennas are active and used, but the number of users in a group is altered based on network conditions such that some antennas serve one group and other antennas serve other groups. In another embodiment, some antennas are inactivated and the remaining active antennas are used with appropriately grouped users such that some antennas serve one group and other antennas server other groups.

Figure 3:
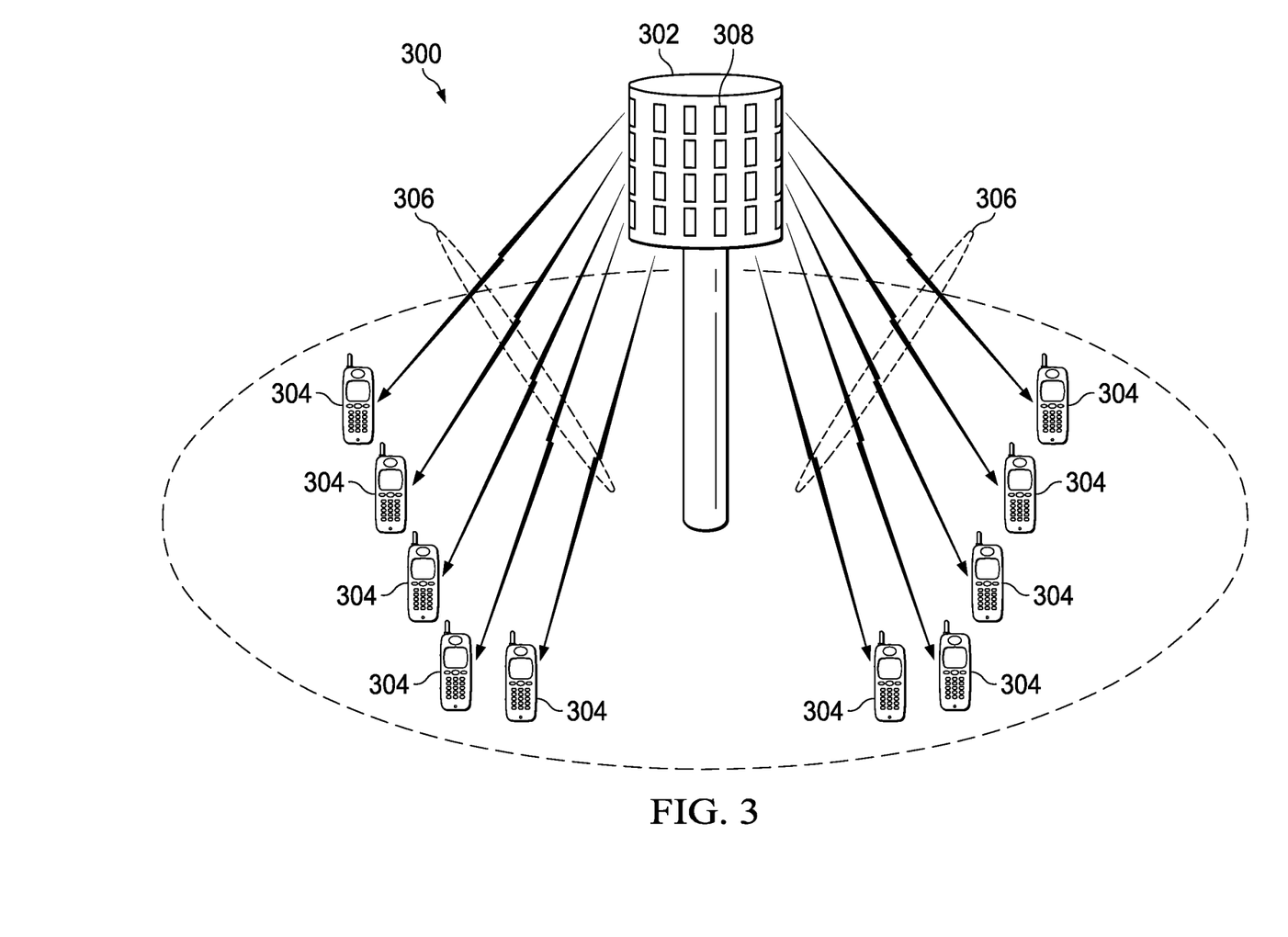
FIG. 3 shows an embodiment system for a massive MIMO wireless network.

FIG. 3 shows an embodiment system 300 for a massive MIMO wireless network. The system 300 includes a massive MIMO access point (AP) 302 communicating using wireless links 306 with multiple user equipment (UEs) 304. As used herein, the term AP may also be referred to as a transmission point (TP) or a base station and the three terms may be used interchangeably throughout this disclosure. The wireless link 306 can use a pair of carrier frequencies. Not shown in system 300 are some of the network elements used to support the AP 302 such as a backhaul network, management entities, etc. The transmission from the massive MIMO AP 302 to a UE 304 is called downlink (DL) transmission, and the transmission from a UE 304 to the massive MIMO AP 302 is called uplink (UL) transmission. The massive MIMO AP 302 includes multiple antennas 308. In an embodiment, the number of antennas 308 at the massive MIMO AP 302 is between 20 and 100, but can be more in other embodiments.

The massive MIMO AP 302 may include any component capable of providing wireless access by, inter alia, establishing uplink and/or downlink connections with the UEs 304, such as a base station transceiver (BST), a base station (BS), an evolved Node B (eNB), a femtocell, or other wirelessly enabled devices. The UEs 304 may be any devices capable of establishing a wireless connection with the massive MIMO AP 302. The UEs 304 may be smartphones, tablet computers, laptop computers, and the like. The backhaul network (not shown) may be any component or collection of components that allow data to be exchanged between the massive MIMO AP 302 and a remote end (not shown). In some embodiments, the system 300 may comprise various other wireless devices.

In order to improve network performance, the number of massive MIMO AP 302 antennas utilized for downlink transmission from the total number antennas available at the massive MIMO AP 302 is adjusted adaptively to achieve high throughput. Information used for the adjustment of the number of antennas used for DL CSI may include, for example, Doppler spread or coherence time estimates of one or more UEs 304, the number of UEs 304 that need to be served, and/or estimates of the delay in the system 300. The number of active antennas 308 may vary over different frames. In an embodiment, UEs 304 are grouped together into different classes that may have different numbers of active antennas 308 as the optimum number of active antennas 308. The network can alternate between different UE classes according to different scheduling policies. One advantage of the disclosed systems and methods is an improved trade-off between the resources allocated for downlink CSI acquisition at the massive MIMO AP 302 and the resources allocated for data transmission.

If user grouping is used, the massive MIMO AP 302 periodically obtains channel quality parameters either directly from uplink signals (e.g., Doppler estimates) or via feedback from UEs 304 (e.g., signal-to-noise-ratio (SNR) reports in terms of a channel quality indicator (CQI) or an average received signal power (RSRP)). UEs 304 with similar channel characteristics may be grouped together. A finite number of possible user groups may be pre-defined based on the typical set of channel quality parameters. The UE grouping may be performed periodically due to possible changes in channel quality parameters of some users. Alternatively, the UE grouping may be performed in response to an event or trigger. In other embodiments, UE grouping may not be utilized.

The massive MIMO AP 302 schedules UEs 304 from the user group to be served in a specific frame. If UE grouping is used, the massive MIMO AP 302 selects the specific user class to be served in a specific frame. Unused antennas in a frame are turned off. In each frame, only one user group is served by the massive MIMO AP 302.

The massive MIMO AP 302 acquires information used for adaptation from the scheduled UEs 304. This information may be Doppler or coherence time estimates from the UE 304, estimates of the delay in the system 300, and/or large-scale fading coefficients of the channels or average path loss between the massive MIMO AP 302 and the scheduled UEs 304. This information may be acquired directly from uplink signals or via feedback from the scheduled UEs 304. The massive MIMO AP 302 determines the optimal number of active antennas to be used in a specific frame to serve the scheduled UEs 304 based on the total number of scheduled users, the corresponding information for adaptation, and/or the UEs' 304 channel characteristics. The massive MIMO AP 302 may select the corresponding active antennas randomly or according to a predefined selection policy. The massive MIMO AP 302 also chooses the proper set of downlink training sequences or pilots for the selected number of active antennas and then transmits the pilots to the scheduled UEs 304. The AP 302 receives DL CSI information sent back from the scheduled UEs 304. Based on the DL CSI information received by the massive MIMO AP 302 from the scheduled UEs 304, the massive MIMO AP 302 designs corresponding precoders and then transmits the data to the scheduled UEs 304.

If a UE 304 is scheduled in a specific frame, it estimates the DL CSI based on downlink pilots, e.g., using an MMSE estimation method or a least squares method. Only the UEs 304 that are scheduled in a specific frame are able to estimate the DL CSI during that specific frame. The UE 304 sends back the estimated DL CSI to the massive MIMO AP 302, e.g., using an analog feedback or another feedback technique, for example based on quantized CSI feedback, also known as limited feedback. Periodic channel quality parameters are sent back to the massive MIMO AP 302 to assist the massive MIMO AP 302 in user grouping and/or scheduling. If user grouping is used, the pre-defined user group descriptions may be shared between the massive MIMO AP 302 and the UEs 304. In one embodiment in which user grouping is utilized, the UE 304 itself may determine when it should be moved to a new user group, and then the UE 304 sends the massive MIMO AP 302 a user group index instead of a whole set of channel quality parameters.

In an embodiment, the massive MIMO AP 302 shuts off or deactivates antennas that are not being utilized for DL CSI, thereby changing the number of active transmit antennas that are used for the DL or the UL. In an alternate embodiment, a fixed precoder (not dependent on the channel) is used to vary the number of data streams and the corresponding number of served users, while still using all of the physical antennas of the MIMO AP 302. A fixed precoder is a precoder that has a fixed mapping of data streams (virtual antennas) to physical antennas. Because of the fixed mapping, it does not require open-loop feedback, and does not require channel state information. In this manner, all the antennas could be used to serve a subset of data streams without the need to shut off some transmit antennas. The same set of antennas is used for UL CSI estimation, DL CSI estimation, DL CSI feedback, and DL data transmission. However, a different set of antennas may be used for UL data transmission. For example, the massive MIMO AP 302 informs a specific user group (with similar channel characteristics) that they may be served in a frame. Based on the network parameters obtained about the users in the group, the AP 302 determines the optimal number of users in this specific group that is actually scheduled to be served in this frame. The scheduled users may be selected randomly or according to a predefined selection policy from the group. The massive MIMO AP 302 then designs its precoders to send data streams to only the actually scheduled users. The other users in the group are not served in this frame.

In an embodiment, the antennas used in a particular frame may be determined randomly or according to performance-related criteria.

In another embodiment, the system includes analog beamforming hardware. Each stream is not directly connected to one or more antennas, but rather, each stream is connected to one or more beamformers. The number of beams utilized in a frame can be adjusted according to, for example, (1) the number of users that need to be served, (2) the large-scale fading coefficients of the channels from the base station to the users, and (3) delays and mobility in the system. Thus, the number of beams being used in a frame may be reduced, but the number of antennas used may not necessarily be reduced.

Figure 4:
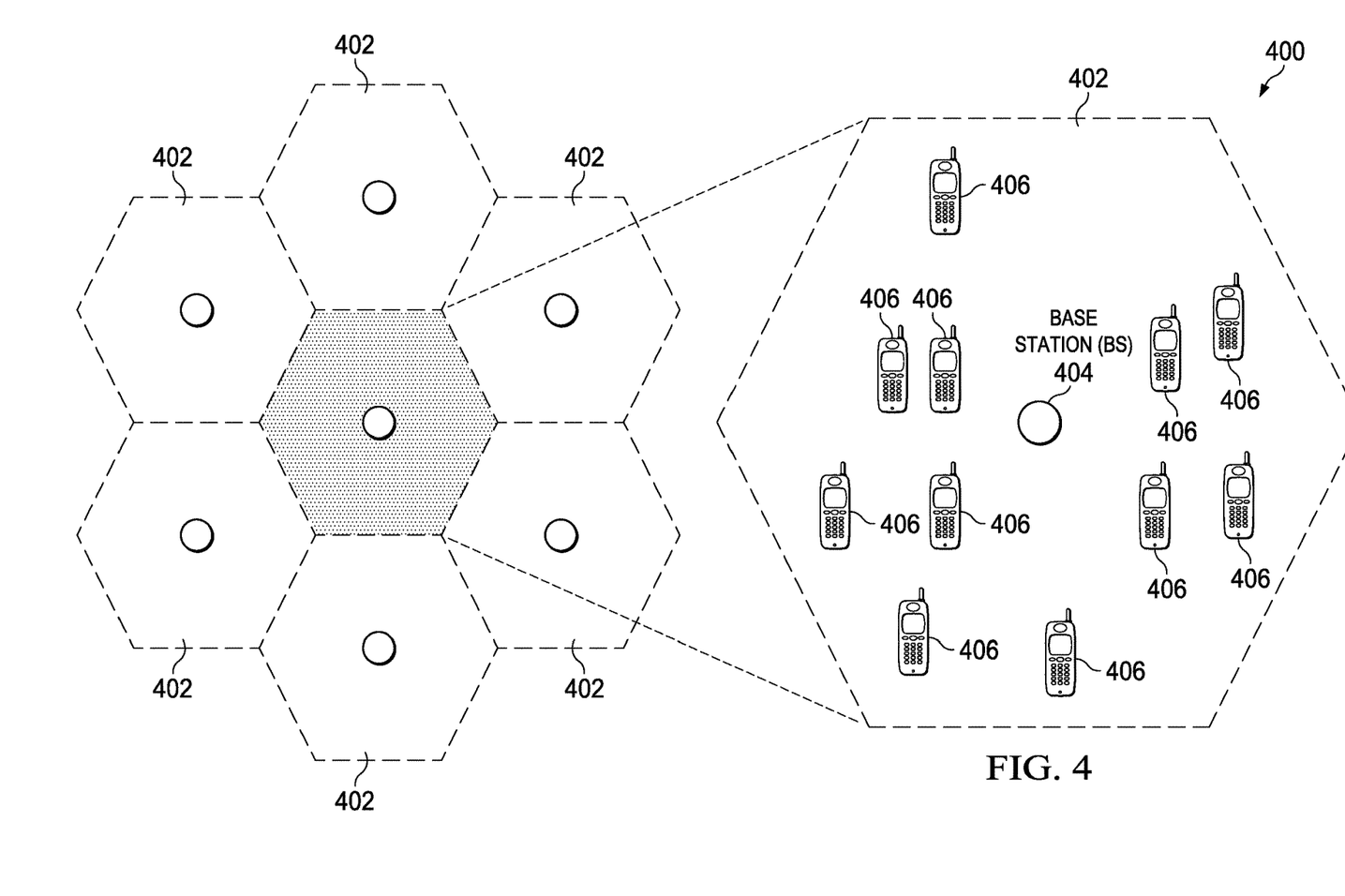
FIG. 4 is a diagram of an embodiment of a massive MIMO wireless network.

FIG. 4 is a diagram of an embodiment of a network 400 for a massive MIMO wireless network. Network 400 includes a plurality of cells 402. Each cell 402 includes a massive MIMO base station (BS) 404 and a plurality of UEs 406. Each massive MIMO BS 404 includes a plurality of antennas. In an embodiment, the number of antennas for each massive MIMO BS 404 may be dozens or hundreds. Each massive MIMO BS 404 performs in a similar manner to massive MIMO AP 302 described above.

Figure 5:
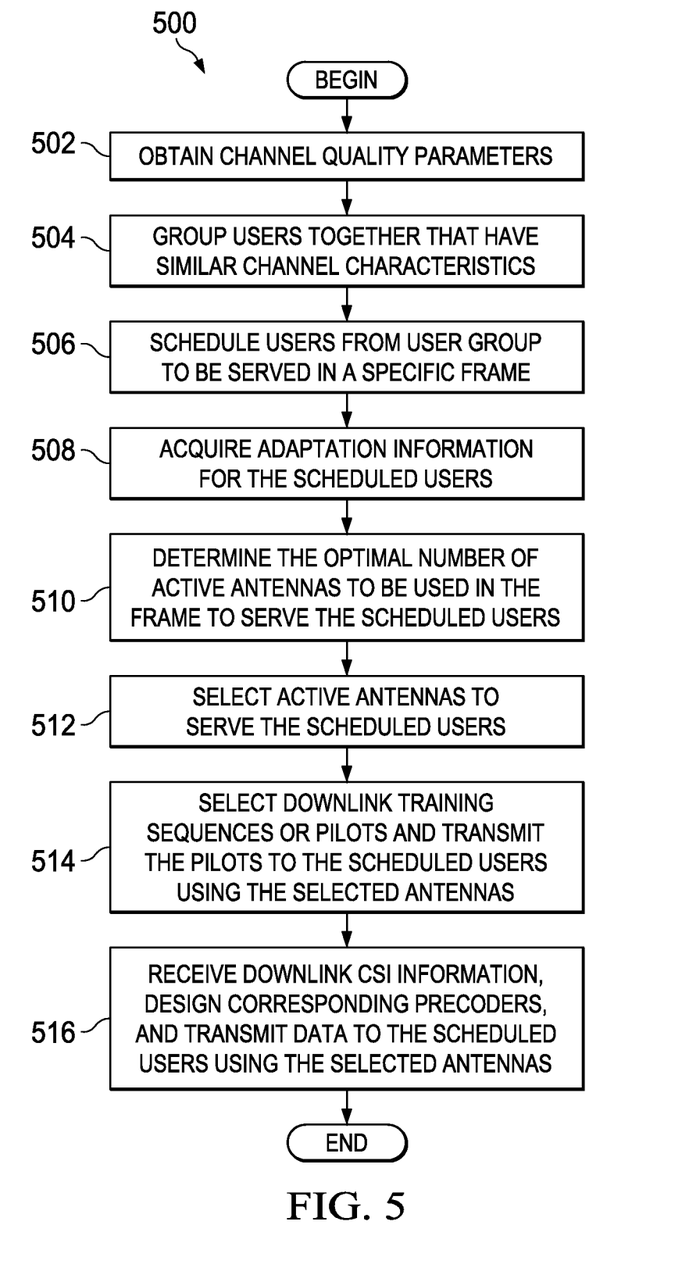
FIG. 5 is a flowchart of an embodiment of a method in a base station for massive MIMO adaptation.

FIG. 5 is a flowchart of an embodiment of a method 500 in a massive MIMO base station for massive MIMO adaptation. The method 500 begins at block 502 where the massive MIMO base station obtains channel quality parameters. At block 504, the massive MIMO base station groups users together that have similar channel characteristics. At block 506, the massive MIMO base station schedules users from the user group to be served in a specific frame and at block 508, the massive MIMO base station acquires adaptation information for the scheduled users. At block 510, the massive MIMO base station determines the optimal number of active antennas to be used in the frame to serve the scheduled users and at block 512, the massive MIMO base station selects the active antennas to serve the scheduled users. At block 514, the massive MIMO base station selects DL training sequences or pilots and transmits the training sequences or pilots to the scheduled users using the selected antennas. At block 516, the massive MIMO base station receives downlink CSI information from the scheduled users, designs corresponding precoders according to the CSI information, and transmits data to the scheduled users using the precoders and the selected antennas, after which, the method 500 ends.

Figure 6:
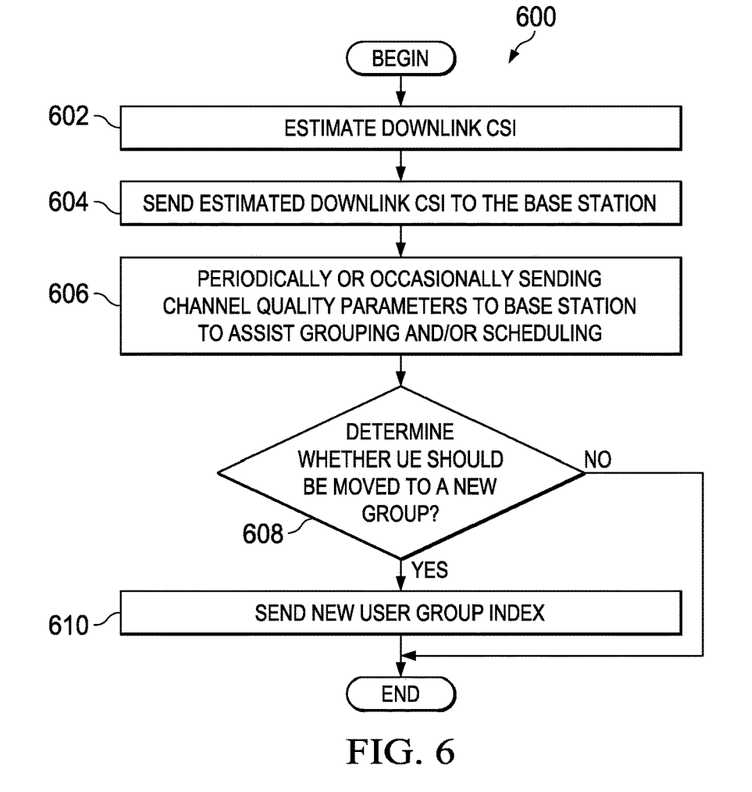
FIG. 6 is a flowchart of an embodiment of a method in a UE for providing a base station with information for massive MIMO adaptation.

FIG. 6 is a flowchart of an embodiment of a method 600 in a UE for providing a massive MIMO base station with information for massive MIMO adaptation. The method 600 begins at block 602 where the UE estimates the DL CSI. At block 604, the UE sends the estimated DL CSI to the massive MIMO base station. At block 606, the UE periodically or occasionally sends channel quality parameters to the massive MIMO base station to assist grouping and/or scheduling. At block 608, the UE determines whether the UE should be moved to a new group. In an embodiment, the UE needs to know how the user groups are defined based on one or more system parameters, such as Doppler estimates and/or large-scale fading coefficients, as stated above. The UE may estimate the value of those parameters based on DL signals and then classify itself into the appropriate user group. If, at block 608, the UE determines that it should be moved to a new group, the method 600 proceeds to block 610, where the UE sends the new user group index to the massive MIMO base station, after which the method 600 ends. If, at block 608, the UE determines that it should remain in its current group, the method 600 ends.

In an embodiment, the massive MIMO base station determines when to move a UE to another group and the method 600 ends after block 606.

Figure 7:
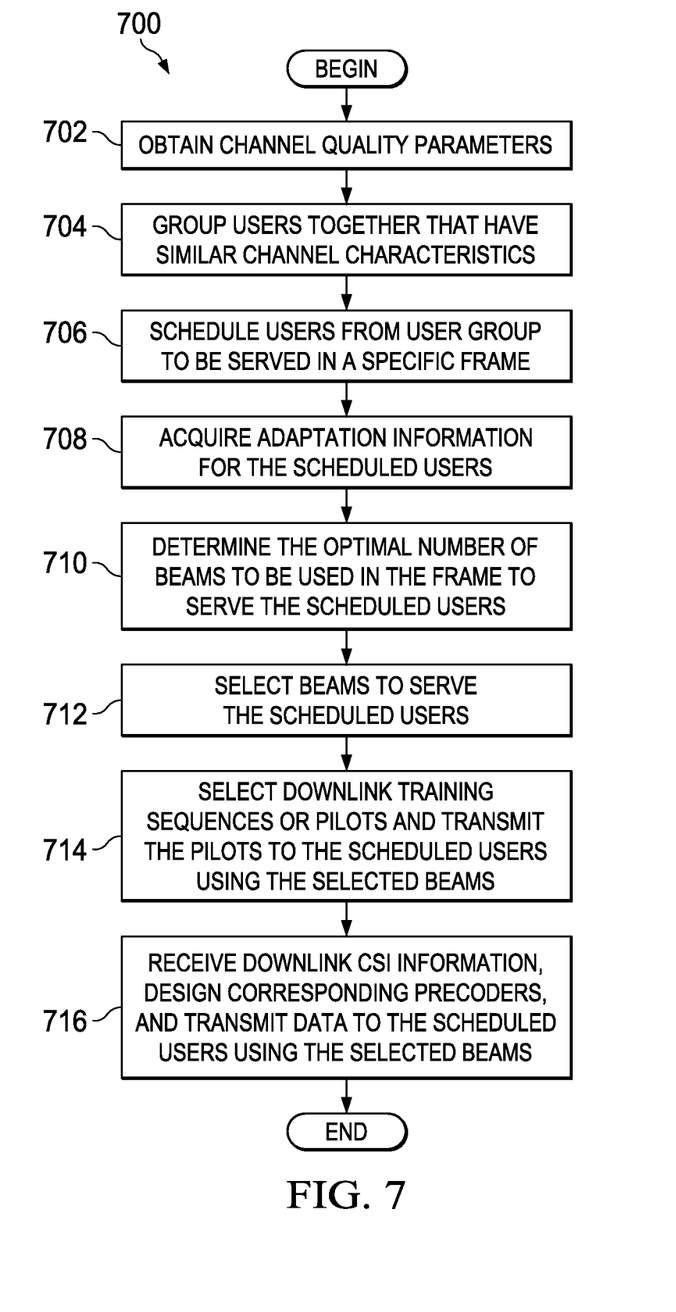
FIG. 7 is a flowchart of an embodiment of a method in a base station for massive MIMO adaptation using beamformers.

FIG. 7 is a flowchart of an embodiment of a method 700 in a massive MIMO base station for massive MIMO adaptation using beamformers. The method 700 begins at block 702 where the massive MIMO base station obtains channel quality parameters. At block 704, the massive MIMO base station groups users together that have similar channel characteristics. At block 706, the massive MIMO base station schedules users from each user group to be served in a specific frame. At block 708, the massive MIMO base station acquires adaptation information for the scheduled users. At block 710, the massive MIMO base station determines the optimal number of predetermined static analog beamformers to be used in the frame to serve the scheduled users. At block 712, the massive MIMO base station selects the static analog beamformers to serve the scheduled users. At block 714, the massive MIMO base station selects DL training sequences or pilots and transmits the training sequences or pilots to the scheduled users using beams formed by the selected static analog beamformers. At block 716, the massive MIMO base station receives downlink CSI information from the scheduled users, designs corresponding precoders according to the CSI information, and transmits data to the scheduled users using the precoders and the beams formed by the selected beamformers, after which the method 700 ends. In an embodiment, the pilots and data are transmitted via analog beamforming.

Figure 8:
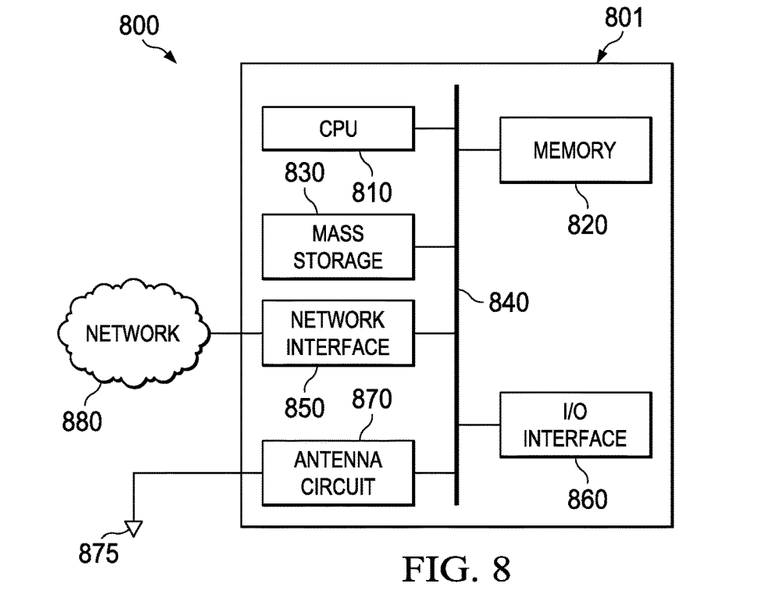
FIG. 8 is a block diagram of a processing system that may be used for implementing the devices and methods disclosed herein.

FIG. 8 is a block diagram of a processing system 800 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, or receivers. The processing system 800 may include a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

The bus 840 may be one or more of any type of several bus architectures including a memory bus or memory controller, a peripheral bus, video bus, or the like. The CPU 810 may include any type of electronic data processor. The memory 820 may include any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may include any type of storage device configured to store data, programs, and other information and to make the data, programs, and other information accessible via the bus 840. The mass storage device 830 may include, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a wireless network, such as Long Term Evolution (LTE), Code Division Multiple Access (CDMA), Wideband CDMA (WCDMA), and Global System for Mobile Communications (GSM) networks. In some embodiments, the antenna circuit 870 and antenna element 875 may also provide Bluetooth and/or WiFi connection to other devices.

The processing unit 801 may also include one or more network interfaces 850, which may include wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a network component in a massive multiple-input, multiple-output (MIMO) network, comprising:
    grouping, by the network component, a plurality of user equipments (UEs) into a first group of UEs and a second group of UEs based on a first average received signal strength associated with the first group of UEs and a second average received signal strength associated with the second group of UEs;
    determining, by the network component, a first number of active antennas in a massive MIMO access point (AP) to use for transmitting in a first time frame to maximize a first average downlink (DL) achievable sum-rate according to the first average received signal strength associated with the first group of UEs, the first number of active antennas selected being less than a total number of antennas available in the massive MIMO AP;
    determining, by the network component, a second number of active antennas in the massive MIMO AP to use for transmitting in a second time frame according to the second average received signal strength, the second average received signal strength being different from the first average received signal strength, wherein the second number of active antennas determined for use in the second time frame is different from the first number of active antennas determined for use in the first time frame;
    serving only the first group of UEs using the first number of active antennas determined according to the first average received signal strength in the first time frame; and
    serving only the second group of UEs using the second number of active antennas determined according to the second average received signal strength in the second time frame.

2. The method of claim 1, wherein the determining the first number of active antennas comprises determining the first number of active antennas according to the first average received signal strength and network parameters comprising Doppler estimates from the first group of UEs.

3. The method of claim 1, wherein the determining the first number of active antennas comprises determining the first number of active antennas according to the first average received signal strength and network parameters comprising a number of users to be served by the massive MIMO AP.

4. The method of claim 1, wherein the determining the first number of active antennas comprises determining the first number of active antennas according to the first average received signal strength and network parameters comprising mobility of the first group of UEs.

5. The method of claim 1, wherein the determining the first number of active antennas comprises determining the first number of active antennas according to the first average received signal strength and network parameters comprising delays in the massive MIMO network.

6. The method of claim 1, wherein the determining the first number of active antennas comprises determining the first number of active antennas according to the first average received signal strength and network parameters comprising large-scale fading coefficients of a channel from the massive MIMO AP to the first group of UEs.

7. The method of claim 1, further comprising:
    obtaining channel quality parameters including the first average received signal strength and the second average received signal strength from feedback from the plurality of UEs.

8. The method of claim 1, further comprising:
    sharing user group descriptions with the first group of UEs;
    receiving an indication from one of the plurality of UEs that the one of the plurality of UEs should be moved to a different group; and
    adding the one of the plurality of UEs to the different group.

9. The method of claim 1, wherein the network component is the massive MIMO AP.

10. A network component in a massive multiple-input, multiple-output (MIMO) network comprising:
    a processor; and
    a non-transitory computer readable storage medium storing programming for execution by the processor, the programming including instructions to:
        group a plurality of user equipments (UEs) into a first group of UEs and a second group of UEs based on a first average received signal strength associated with the first group of UEs and a second average received signal strength associated with the second group of UEs;
        determine a first number of active antennas in a massive MIMO access point (AP) to use for transmitting in a first time frame to maximize a first average downlink (DL) achievable sum-rate according to the first average received signal strength associated with the first group of UEs, the first number of active antennas selected being less than a total number of antennas available;

determine a second number of active antennas in the massive MIMO AP to use for transmitting in a second time frame according to the second average received signal strength, the second average received signal strength being different from the first average received signal strength, wherein the second number of active antennas determined for use in the second time frame is different from the first number of active antennas determined for use in the first time frame;

serve only the first group of UEs using the first number of active antennas determined according to the first average received signal strength in the first time frame; and serve only the second group of UEs using the second number of active antennas determined according to the second average received signal strength in the second time frame.

11. The network component of claim 10, wherein the programming including instructions to determine the first number of active antennas includes instructions to determine the first number of active antennas according to the first average received signal strength and network parameters comprising Doppler estimates from the first group of UEs.

12. The network component of claim 10, wherein the programming including instructions to determine the first number of active antennas includes instructions to determine the first number of active antennas according to the first average received signal strength and network parameters comprising a number of users to be served by the massive MIMO AP.

13. The network component of claim 10, wherein the programming including instructions to determine the first number of active antennas includes instructions to determine the first number of active antennas according to the first average received signal strength and network parameters comprising mobility of the first group of UEs.

14. The network component of claim 10, wherein the programming including instructions to determine the first number of active antennas includes instructions to determine the first number of active antennas according to the first average received signal strength and network parameters comprising delays in the massive MIMO network.

15. The network component of claim 10, wherein the programming including instructions to determine the first number of active antennas includes instructions to determine the first number of active antennas according to the first average received signal strength and network parameters comprising large-scale fading coefficients of a channel from the massive MIMO AP to the first group of UEs.

16. The network component of claim 10, wherein the programming further comprises instructions to:
    obtain channel quality parameters including the first average received signal strength and the second average received signal strength from feedback from the plurality of UEs.

17. The network component of claim 10, wherein the programming further comprises instructions to:
    share user group descriptions with the plurality of UEs;
    receive an indication from one of the plurality of UEs that the one of the plurality of UEs should be moved to a different group; and
    add the one of the plurality of UEs to the different group.

18. The network component of claim 10, wherein the network component is the massive MIMO AP.

* * * * *